United States Patent [19]
Roberts et al.

[11] Patent Number: 5,984,495
[45] Date of Patent: Nov. 16, 1999

[54] VEHICULAR DOME LIGHT WITH REMOVABLE FLASHLIGHT

[76] Inventors: Steve Roberts, P.O. Box 2433, Conroe, Tex. 77305; David K. House, II, 12814 Anmar Dr., Cleveland, Tex. 77327

[21] Appl. No.: 09/031,507

[22] Filed: Feb. 26, 1998

[51] Int. Cl.⁶ ........................................................ B60Q 3/00
[52] U.S. Cl. .......................... 362/490; 362/486; 362/183; 362/191
[58] Field of Search ..................................... 362/488, 490, 362/492, 486, 191, 183, 398

[56] References Cited

U.S. PATENT DOCUMENTS

| | | | |
|---|---|---|---|
| 4,984,137 | 1/1991 | Maemura | 362/492 |
| 5,077,643 | 12/1991 | Leach | 362/183 |

*Primary Examiner*—Stephen Husar

[57] ABSTRACT

A dome light assembly is provided including a first pair of contacts mounted on an interior surface of a vehicle and connected to a power source. Also included is a flashlight with a second pair of contacts releasably connectable to the first pair of contacts. A rechargeable battery is connected to the second pair of contacts. A switch is connected between the battery and a lamp situated within the flashlight.

10 Claims, 2 Drawing Sheets

VEHICULAR DOME LIGHT WITH REMOVABLE FLASHLIGHT

BACKGROUND OF THE INVENTION

1. Field of the Invention

The present invention relates to dome lights and more particularly pertains to a new vehicular dome light with removable flashlight for providing a readily accessible, vehicle-mounted portable flashlight.

2. Description of the Prior Art

The use of dome lights is known in the prior art. More specifically, dome lights heretofore devised and utilized are known to consist basically of familiar, expected and obvious structural configurations, notwithstanding the myriad of designs encompassed by the crowded prior art which have been developed for the fulfillment of countless objectives and requirements.

Known prior art dome lights include U.S. Pat. No. 5,303,128; U.S. Pat. No. 4,807,096; U.S. Pat. No. 3,936,670; U.S. Pat. No. 4,646,210; U.S. Pat. No. 5,319,365; and U.S. Pat. No. Des. 343,915.

In these respects, the vehicular dome light with removable flashlight according to the present invention substantially departs from the conventional concepts and designs of the prior art, and in so doing provides an apparatus primarily developed for the purpose of providing a readily accessible, vehicle-mounted portable flashlight.

SUMMARY OF THE INVENTION

In view of the foregoing disadvantages inherent in the known types of dome lights now present in the prior art, the present invention provides a new vehicular dome light with removable flashlight construction wherein the same can be utilized for providing a readily accessible, vehicle-mounted portable flashlight.

The general purpose of the present invention, which will be described subsequently in greater detail, is to provide a new vehicular dome light with removable flashlight apparatus and method which has many of the advantages of the dome lights mentioned heretofore and many novel features that result in a new vehicular dome light with removable flashlight which is not anticipated, rendered obvious, suggested, or even implied by any of the prior art dome lights, either alone or in any combination thereof.

To attain this, the present invention generally comprises a dome light mount including an oval plate screwably mounted to a roof of a vehicle. An elongated linear protruding male strip is formed on a bottom surface of the plate and depends downwardly therefrom along a minor axis of the plate. Note FIG. 3. Also mounted to the bottom surface of the plate is a pair of square planar magnets. Such magnets flank a central extent of the male strip. Also included is a light assembly having a pair of lamp housings mounted to ends of the plate of the dome light mount and depending downwardly therefrom. The lamp housings define a pair of converging vertical side faces for reasons that will soon become apparent. The light assembly also includes a bulb situated within each of the lamp housings. A push button switch is mounted to the plate adjacent to each of the lamp housings for actuating the associated bulb upon the depression thereof. Next provided is a removable flashlight assembly having a generally rectangular configuration with a top face, a bottom face and a pair of converging side faces. As shown in FIG. 4, the top face has an elongated female groove formed therein. A pair of square planar magnets are mounted to the top face of the flashlight assembly and flank a central extent of the female groove. The bottom face further has a pair of angled thumb recesses for gripping purposes. During use, the removable flashlight assembly is slidably removable between the side faces of the dome light mount. As such, the female groove lockingly receives the male strip. Lastly, a flashlight electrical assembly is provided including a first pair of contacts mounted to the male strip of the dome light mount. The first pair of contacts are connected to a power source of the vehicle. Associated therewith is a second pair of contacts mounted within the female groove of the flashlight assembly. The second pair of contacts are to a rechargeable battery situated within the flashlight assembly. Mounted on the bottom face of the flashlight assembly is a switch. Such switch is connected between the rechargeable battery and a lamp situated within the flashlight assembly for selectively actuating the lamp. In use, the rechargeable battery is connected to the contacts of the flashlight assembly for allowing the recharging of the rechargeable battery via the contacts. This is accomplished when the flashlight assembly is mounted to the dome light mount.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicular dome light with removable flashlight apparatus and method which has many of the advantages of the dome lights mentioned heretofore and many novel features that result in a new vehicular dome light with removable flashlight which is not anticipated, rendered obvious, suggested, or even implied by any of the prior art dome lights, either alone or in any combination thereof.

It is another object of the present invention to provide a new vehicular dome light with removable flashlight which may be easily and efficiently manufactured and marketed.

It is a further object of the present invention to provide a new vehicular dome light with removable flashlight which is of a durable and reliable construction.

An even further object of the present invention is to provide a new vehicular dome light with removable flashlight which is susceptible of a low cost of manufacture with regard to both materials and labor, and which accordingly is then susceptible of low prices of sale to the consuming public, thereby making such vehicular dome light with removable flashlight economically available to the buying public.

Still yet another object of the present invention is to provide a new vehicular dome light with removable flashlight which provides in the apparatuses and methods of the prior art some of the advantages thereof, while simultaneously overcoming some of the disadvantages normally associated therewith.

Still another object of the present invention is to provide a new vehicular dome light with removable flashlight for providing a readily accessible, vehicle-mounted portable flashlight.

Even still another object of the present invention is to provide a new vehicular dome light with removable flashlight that includes a first pair of contacts mounted on an interior surface of a vehicle and connected to a power source. Also included is a flashlight with a second pair of contacts releasably connectable to the first pair of contacts. A rechargeable battery is connected to the second pair of contacts. A switch is connected between the battery and a lamp situated within the flashlight.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
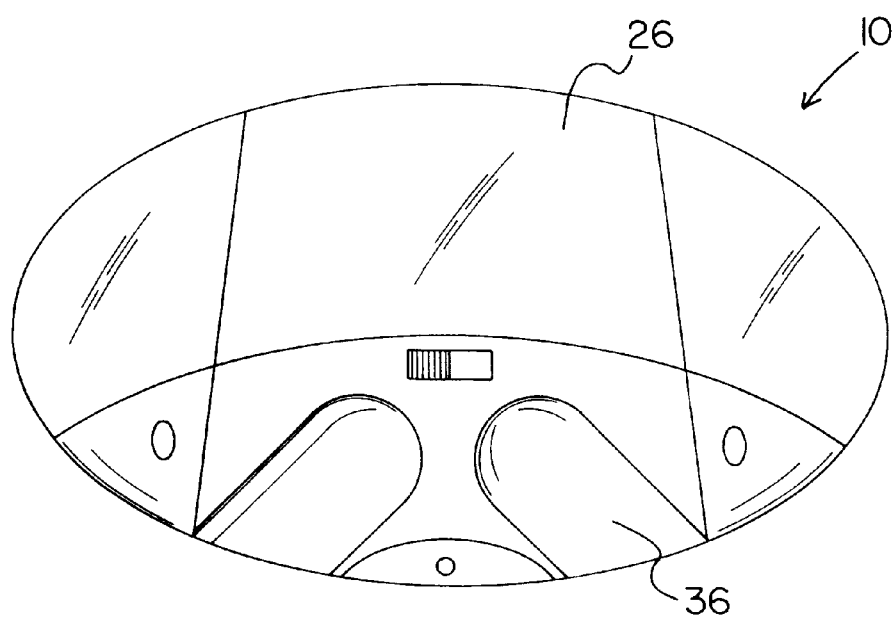
FIG. 1 is a bottom view of a new vehicular dome light with removable flashlight according to the present invention.

With reference now to the drawings, and in particular to FIGS. 1 through 4 thereof, a new vehicular dome light with removable flashlight embodying the principles and concepts of the present invention and generally designated by the reference numeral 10 will be described.

The present invention, designated as numeral 10, includes a dome light mount 12 including an oval plate 14 screwably mounted to a roof of a vehicle. An elongated linear protruding male strip 16 is formed on a bottom surface of the plate and depends downwardly therefrom along a minor axis of the plate. Note FIG. 3. As shown in such Figure, the male strip extends along only a large portion of the dome light mount. Also mounted to the bottom surface of the plate is a pair of square planar magnets 18. Such magnets flank a central extent of the male strip.

Also included is a light assembly having a pair of lamp housings 20 mounted to ends of the plate of the dome light mount and depending downwardly therefrom. The lamp housings define a pair of converging vertical side faces 22 for reasons that will soon become apparent. The light assembly also includes a bulb situated within each of the lamp housings. A push button switch 24 is mounted to the plate adjacent to each of the lamp housings for actuating the associated bulb upon the depression thereof.

Figure 4:
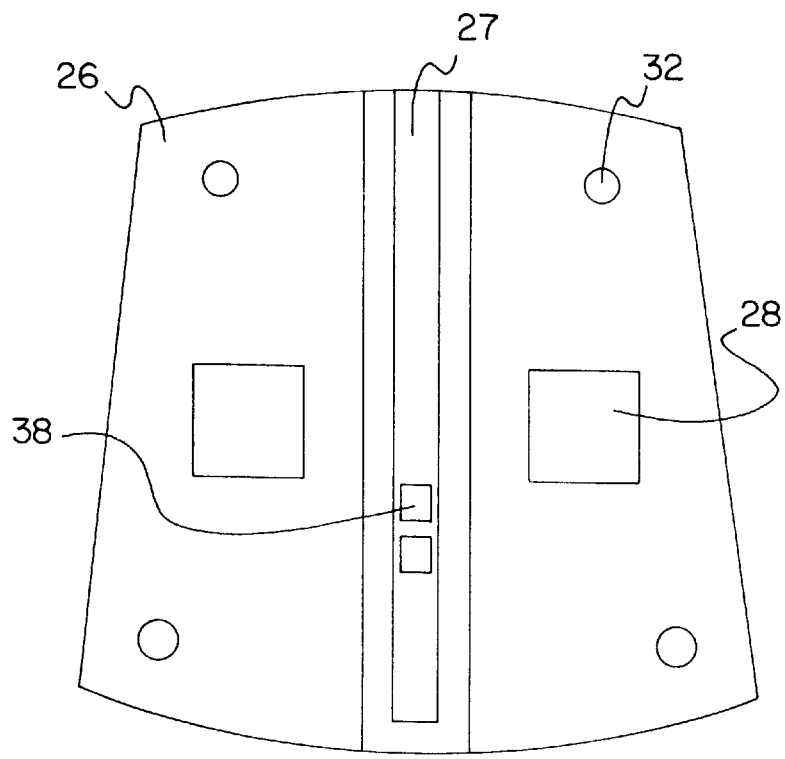
FIG. 4 is a top view of the flashlight assembly of the present invention.

Next provided is a removable flashlight assembly 26 having a generally rectangular configuration with a top face, a bottom face and a pair of converging side faces. As shown in FIG. 4, the top face has an elongated female groove 27 formed therein. Preferably, a dove tail groove and strip combination or the like is employed. Similar to the male strip, the female groove only extends along a portion of the top face of the flashlight assembly. A pair of square planar magnets 28 are mounted to the top face of the flashlight assembly and flank a central extent of the female groove. The bottom face further has a pair of angled thumb recesses 30 for gripping purposes.

Figure 2:
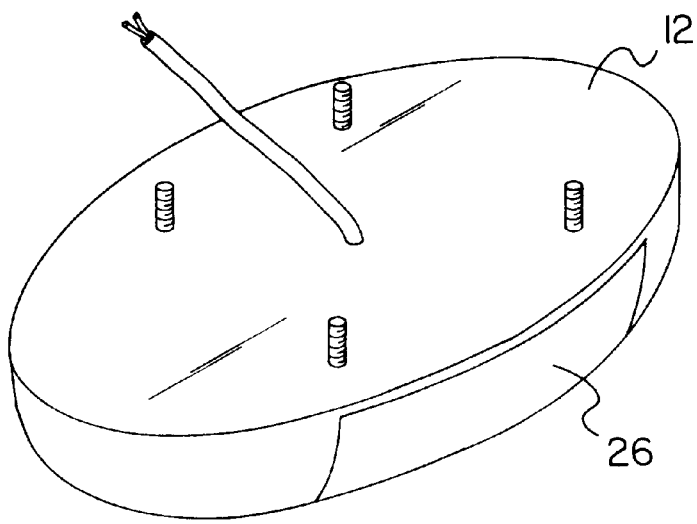
FIG. 2 is a top perspective view of the present invention.
Figure 3:
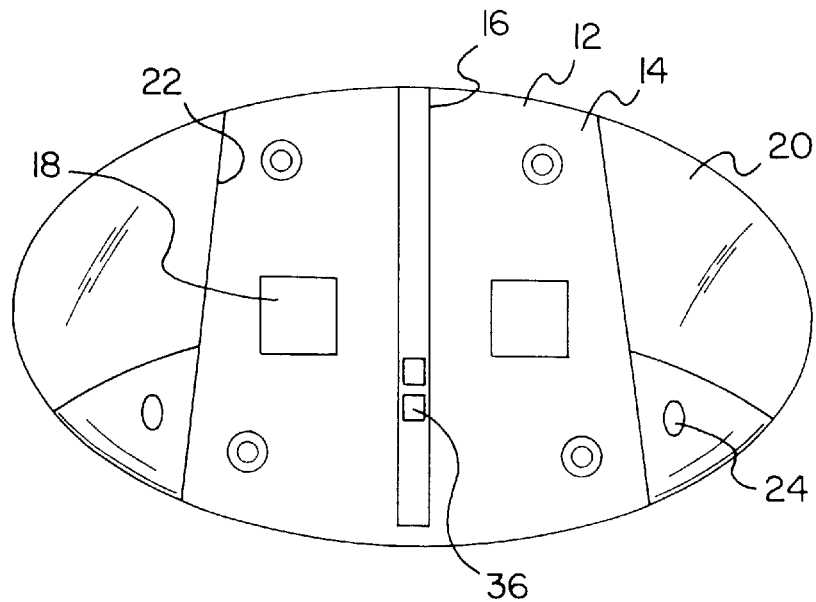
FIG. 3 is a bottom view of the present invention with the flashlight assembly removed.

During use, the removable flashlight assembly is slidably removable between the side faces of the dome light mount in a water tight manner. As such, the female groove lockingly receives the male strip. The magnets work together to maintain the flashlight assembly in place. To further couple the flashlight and dome light mount, risers 32 are formed on the top face of the flashlight assembly. It should be noted that the magnets of the flashlight further serve to allow the flashlight to be mounted on a metallic recipient surface such as a hood of the vehicle. As can be seen in FIG. 2, the flashlight and light assemblies together form an ellipsoidal dome. It should be noted that various other shapes may be incorporated.

Lastly, a flashlight electrical assembly is provided including a first pair of contacts 36 mounted to the male strip of the dome light mount. The first pair of contacts are connected to a power source of the vehicle. Associated therewith is a second pair of contacts 38 mounted within the female groove of the flashlight assembly. The second pair of contacts are connected to a rechargeable battery situated within the flashlight assembly. Mounted on the bottom face of the flashlight assembly is a switch. Such switch is connected between the rechargeable battery and a lamp situated within the flashlight assembly. The switch is adapted for selectively actuating the lamp.

When the flashlight assembly is mounted on the dome light mount, the rechargeable battery is connected to the contacts of the flashlight assembly for allowing the recharging of the rechargeable battery. As an option, a light is situated on the flashlight assembly for indicating when the rechargeable battery is low on power.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A dome light assembly comprising, in combination:
    a dome light mount including an oval plate screwably mounted to a roof of a vehicle, an elongated linear protruding male strip formed on a bottom surface of the plate and depending downwardly therefrom along a minor axis of the plate, a pair of square planar magnets mounted to the bottom surface of the plate and flanking a central extent of the male strip;
    a light assembly including a pair of lamp housings mounted to ends of the plate of the dome light mount and depending downwardly therefrom, the lamp housings defining a pair of converging vertical side faces, the light assembly including a bulb situated within each of the lamp housings and a push button switch mounted to the plate adjacent to each of the lamp housings for actuating the associated bulb upon the depression thereof;
    a removable flashlight assembly having a generally rectangular configuration with a top face, a bottom face and a pair of converging side faces, the top face having an elongated female groove formed therein, a pair of square planar magnets mounted to the top face of the flashlight assembly and flanking a central extent of the female groove, the bottom face having a pair of angled thumb recesses for gripping purposes, whereby the removable flashlight assembly is slidably removable between the side faces of the dome light mount such that the female groove lockingly receives the male strip; and
    a flashlight electrical assembly including a first pair of contacts mounted to the male strip of the dome light mount which are connected to a power source, a second pair of contacts mounted within the female groove of the flashlight assembly and connected to a rechargeable battery situated within the flashlight assembly, a switch mounted on the bottom face of the flashlight assembly and connected between the rechargeable battery and a lamp situated within the flashlight assembly for selectively actuating the lamp, wherein the rechargeable battery is connected to the contacts of the flashlight assembly for allowing the recharging of the rechargeable battery via the contacts when the flashlight assembly is mounted to the dome light mount.

2. A dome light assembly comprising:
    a first pair of contacts mounted on an interior surface of a vehicle and connected to a power source; and
    a flashlight including a second pair of contacts releasably connectable to the first pair of contacts, a rechargeable battery connected to the second pair of contacts, a lamp and a switch connected to the rechargeable battery, wherein the flashlight has at least one magnet mounted thereon.

3. A dome light assembly as set forth in claim 2 wherein the contacts are mounted on a groove and protrusion combination.

4. A dome light assembly as set forth in claim 2 wherein the first pair of contacts are situated on a dome light mount.

5. A dome light assembly as set forth in claim 4 wherein the dome light mount includes a pair of light assemblies which flank the first pair of contacts.

6. A dome light assembly as set forth in claim 2 wherein another magnet is mounted on the vehicle and situated adjacent to the first pair of contacts.

7. A dome light assembly comprising:
    a first pair of contacts mounted on an interior surface of a vehicle and connected to a power source; and
    a flashlight including a second pair of contacts releasably connectable to the first pair of contacts, a rechargeable battery connected to the second pair of contacts, a lamp and a switch connected to the rechargeable battery; and
    wherein the first pair of contacts are situated on a dome light mount, and wherein the dome light mount includes a pair of light assemblies which flank the first pair of contacts.

8. A dome light assembly as set forth in claim 7 wherein the contacts are mounted on a groove and protrusion combination.

9. A dome light assembly as set forth in claim 7 wherein the flashlight has at least one magnet mounted thereon.

10. A dome light assembly as set forth in claim 9 wherein another magnet is mounted on the vehicle and situated adjacent to the first pair of contacts.

* * * * *